United States Patent [19]

Pearcy

[11] Patent Number: 4,884,360

[45] Date of Patent: Dec. 5, 1989

[54] MULTI-COMPARTMENT RECEPTACLE FOR FISHING TACKLE OR OTHER ITEMS

[76] Inventor: Frank H. Pearcy, 4212 Beethoven, St. Louis, Mo. 63116

[21] Appl. No.: 173,829

[22] Filed: Mar. 28, 1988

[51] Int. Cl.$^4$ .................... A01K 97/06; B65D 30/22; B65D 85/00

[52] U.S. Cl. ........................... 43/54.1; 43/57.1; 150/112; 206/315.11; 383/39; 383/40

[58] Field of Search ............... 43/54.1, 55, 57.1; 206/315.11, 273, 386, 0.82; 150/112; 383/38, 39, 40, 79, 123, 83, 84

[56] References Cited

U.S. PATENT DOCUMENTS

| | | | |
|---|---|---|---|
| 607,130 | 7/1878 | Rapp | 383/39 |
| 1,291,914 | 1/1919 | Kelley | 383/40 |
| 1,389,175 | 8/1921 | Wright | 383/40 |
| 1,478,497 | 12/1923 | Welch | 43/57.1 |
| 1,521,897 | 1/1925 | Martin | 383/40 |
| 2,359,372 | 10/1944 | Leader | 383/39 |
| 2,580,912 | 1/1952 | Hawthorne | 43/54.1 |
| 4,101,025 | 7/1978 | Jordan | 383/39 |
| 4,234,086 | 11/1980 | Dorton | 206/286 |
| 4,715,499 | 12/1987 | Franklin | 383/39 |

*Primary Examiner*—Nicholas P. Godici
*Assistant Examiner*—William Scott Andes
*Attorney, Agent, or Firm*—Senniger, Powers, Leavitt and Roedel

[57] ABSTRACT

A multi-compartment receptacle formed of a sheet of flexible transparent sheet plastic material folded to form a front wall, a back wall and a closure flap overlying the front wall, the front and back wall being secured together along lines extending heightwise spaced at intervals along the length of the receptacle by a series of grommets forming a plurality of compartments, and having snap fasteners for releasably securing the closure flap in position closing each compartment and allowing the portion of each flap closing each compartment to be opened individually.

3 Claims, 3 Drawing Sheets

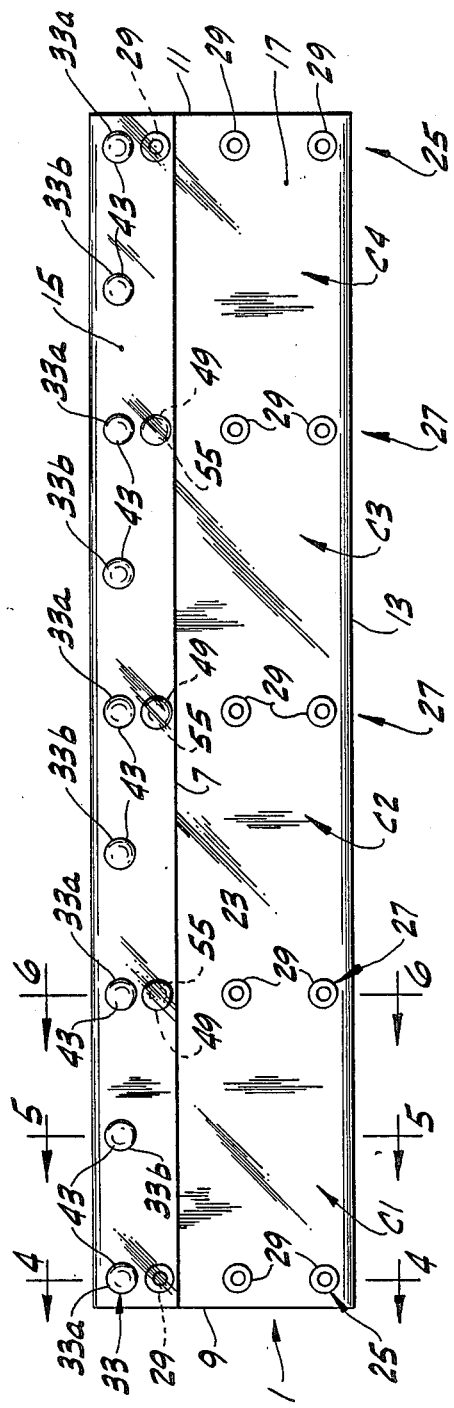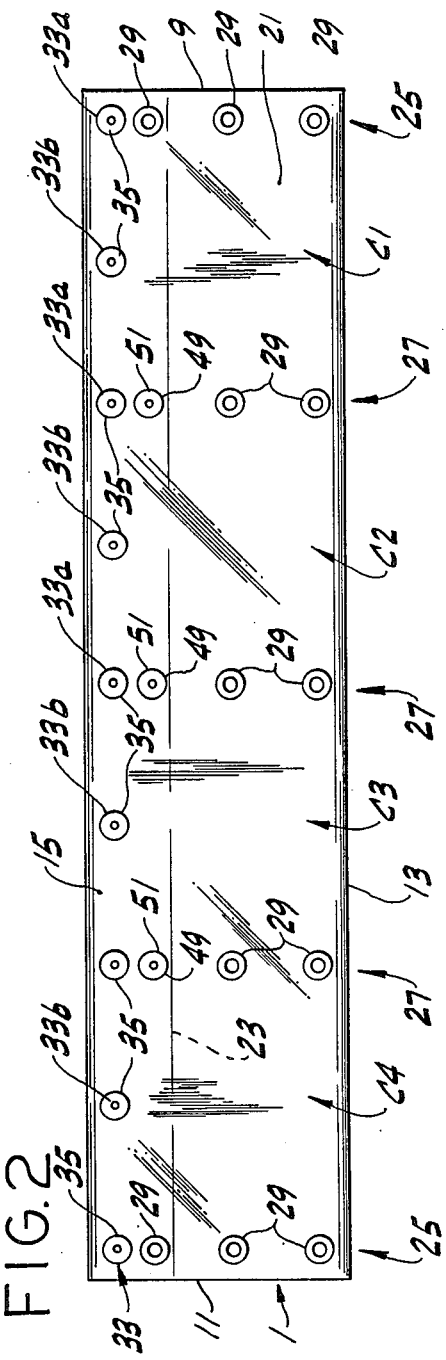

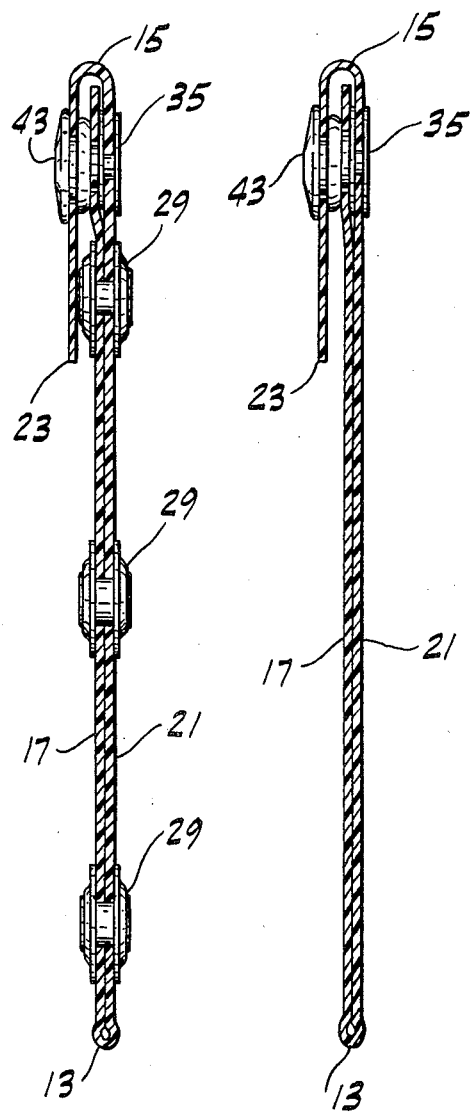
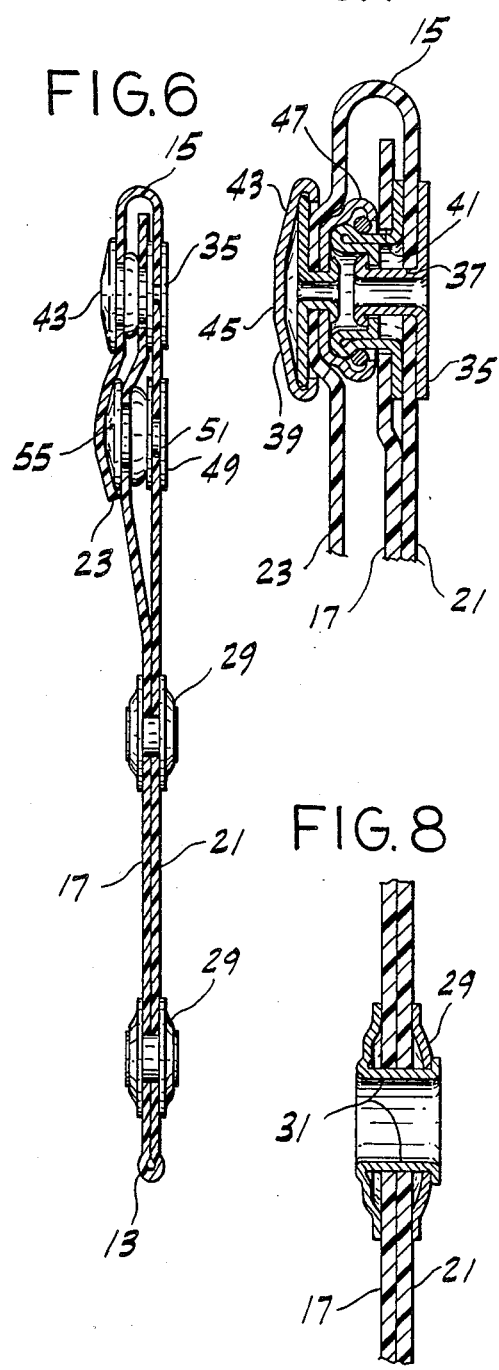
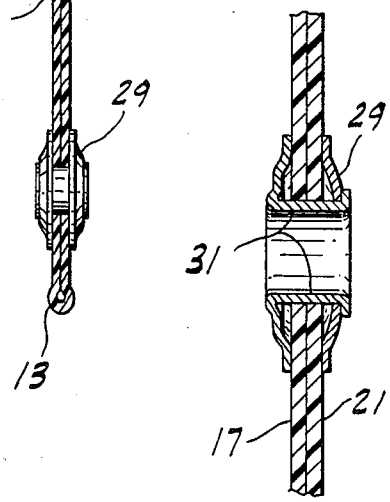

MULTI-COMPARTMENT RECEPTACLE FOR FISHING TACKLE OR OTHER ITEMS

BRIEF SUMMARY OF THE INVENTION

This invention relates to multi-compartment receptacles, and more particularly to a fisherman's multi-compartment receptacle for organizing fishing tackle such as baits, lures, etc.

Among the several objects of the invention may be noted the provision of an improved multi-compartment receptacle of a type especially for use by fishermen for holding and organizing baits, lures, etc.; the provision of such a receptacle which enables viewing of the contents of the compartments from either side for ready reference; the provision of such a receptacle which securely holds items in its compartments while allowing for ready accessibility to each compartment individually; the provision of a heavy-duty receptacle for the purpose described capable of withstanding relatively rough treatment to which it may be subjected in the course of its use in the field; and the provision of such a receptacle capable of ready attachment of strapping for wearing the receptacle around the waist in belt-like manner or over the chest from over a shoulder.

In general, a multi-compartment receptacle of this invention, especially for holding and organizing fishing tackle or other items, comprises an elongate generally rectangular sheet of relatively heavy gauge flexible transparent sheet plastic material having first and second relatively long longitudinal edges and first and second relatively short end edges, the sheet being folded on a first fold line extending from one end edge to the other spaced from said first longitudinal edge a predetermined distance to form a front wall for the receptacle bounded by said first longitudinal edge, said first fold line and said end edges, and a portion comprising a back wall coextensive with the front wall at the back of the front wall and a closure flap for the receptacle, said portion being folded on a second fold line extending from one end edge of the sheet to the other spaced from said first fold line a distance corresponding generally to said predetermined distance to form said closure flap with said closure flap overlying the front wall. The front and back walls are secured together along each of a plurality of lines extending heightwise thereof spaced at intervals along the length of the receptacle by a series of grommets and including a series of grommets adjacent each end of the receptacle, thereby forming a plurality of compartments disposed side-by-side along the length of the receptacle. Each grommet extends through registering holes in the front and back walls. The receptacle further comprises snap fastener means along the length of the closure flap for releasably securing the flap in position closing each compartment and allowing the portion of the flap closing each compartment to be opened individually.

Other objects and features will be in part apparent and in part pointed out hereinafter.

BRIEF DESCRIPTION OF THE DRAWINGS

FIG. 1 is a view in front elevation of a multi-compartment receptacle of this invention;

FIG. 2 is a view in elevation of the back of the receptacle;

FIGS. 4, 5 and 6 are enlarged vertical sections on lines 4—4, 5—5 and 6—6, respectively, of FIG. 1; and FIGS. 7 and 8 are enlarged details of FIGS. 4-6.

Corresponding reference characters indicate correspoinding parts throughout the several views of the drawings.

DETAILED DESCRIPTION

Figure 3:
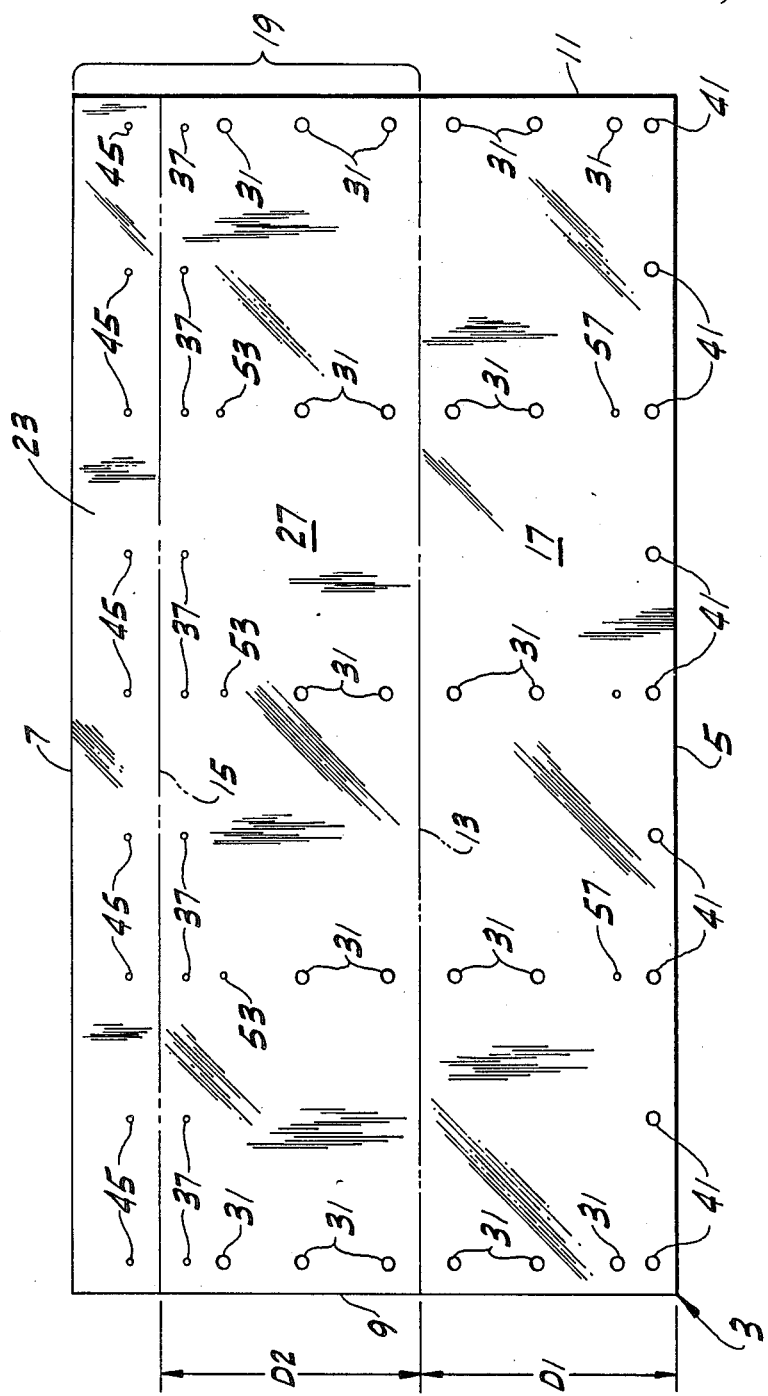
FIG. 3 is a plan of the sheet from which the receptacle of FIGS. 1 and 2 is made.

Referring to the drawings, a multi-compartment receptacle of this invention, and more particularly a four-compartment recpetacle of this invention is generally designated 1, its four compartments being indicated at C1, C2, C3 and C4. The receptacle is made from an elongate generally rectangular sheet 3 of relatively heavy gauge flexible transparent sheet plastic material, such as but not limited to 17 mil. all-weather polyvinyl chloride sheet material, shown in FIG. 3 in an initial flat condition. The sheet has first and second relatively long longitudinal edges designated 5 and 7 and first and second relatively short end edges designated 9 and 11. At 13 and 15 are indicated fold lines on which the sheet is folded to form the receptacle, these lines extending from one end edge to the other parallel to the longitudinal edges of the sheet. The fold line 13 is spaced from the first longitudinal edge 5 of the sheet a predetermined distance D1 to form a front wall 17 for the receptacle bounded by edge 5, fold line 13 and end edges 9 and 11, and a portion 19 comprising a back wall 21, which becomes coextensive with the front wall, and a closure flap 23 for the receptacle, the second fold line 15 being spaced from the first fold line 13 a distance D2 corresponding generally to said distance D1. The line 15 is spaced from the longitudinal edge 7 of the sheet a distance less than half the height of the walls 17 and 21 and the closure flap 23 is thus relatively narrow in respect to the walls.

The receptacle 1 is formed from the sheet 3 by folding the sheet on fold line 13 to bring portion 17 of the sheet up in front of portion 21 to constitute portion 17 as the front wall and portion 21 as the back wall, and securing the front and back walls together along each of a plurality of lines extending heightwise thereof spaced at intervals along the length of the receptacle by a series of grommets, including a series of grommets adjacent each end of the receptacle and, for the four-compartment receptacle herein illustrated (by way of example), three intermediate series which may be spaced at equal intervals so that the compartments are of equal width (though equal width for the compartments is not essential). The two end series of grommets are indicated at 25, each intermediate series is indicated at 27 and each grommet is designated 29. The sheet 3 is formed with holes such as indicated at 31 for receiving the grommets, the holes being located so that those in the front wall register with those in the back wall when the front wall is folded over on the back wall.

The closure flap 23 is folded over on line 15 to overlie the back wall 21 and snap fastener means generally indicated at 33 is provided along its length for releasably securing the flap in position closing each of the four compartments C1-C4 and allowing the portion of the flap closing each compartment to be opened individually. Snap fasteners are provided in line with each of the five series of grommets as indicated at 33a and snap fasteners are provided midway of the series of grommets as indicated at 33b. Each snap fastener 33a, 33b comprises a first element 35 (shown as the male element of the snap fastener) secured at 37 in a hole in the back wall 21 and having a projection or nose 39 extending through a registering hole 41 in the front wall. Holes 41 are pre-punched in the sheet 3 adjacent the longitudinal edge 5 of the sheet and holes 37 are pre-punched in the sheet adjacent and below the fold line 15, holes 41 and 37 registering when the front wall 17 is folded up on the back wall 21. Each snap fastener 33a,b further comprises a second element 43 (the female snap fastener element), these elements 43 being secured in holes indicated at 45 pre-punched in the closure flap 23, and each having a recess 47 receiving the respective nose 39 with a snap fit.

As illustrated, each end series 25 of grommets has three grommets 29 one adjacent the bottom 13 of the walls 17 and 21, one between the top and bottom of the walls and one adjacent the top of the walls, and each intermediate series 27 has two grommets 29, one adjacent the bottom and one between the top and bottom of the walls. In line with the two grommets of each intermediate series 27, auxiliary snap fasteners are provided as indicated at 49 for releasably securing the front and back walls together underneath the closure flap 23 just below the respective closure flap fasteners 33. These snap fasteners 49 facilitate opening the compartments to obtain access thereto. The male elements 51 of fasteners 49 are secured in holes pre-punched in the back wall 21 as indicated at 53 and the female elements 55 of fasteners 49 are secured in holes pre-punched in the front wall 17 as indicated at 57.

It will be observed that the series 25 and 27 of grommets divide the receptacle into the four compartments C1-C4, with ready access individually to each compartment by unfastening the respective snap fasteners 33a,b and also the respective snap fasteners 49 as may be helpful. With the noses 39 of snap fastener elements 35 projecting from the back wall 21 through the holes 41 in the front wall 17, the snap fasteners at 33a and 33b when closed hold the front and back walls together at the top thereof for security, the walls being released for access to a compartment when the appropriate snap fasteners are opened. With the receptacle formed of the relatively heavy transparent sheet plastic material and the compartments formed by use of the grommets, the receptacle is capable of withstanding relatively rough treatment in the field and enables viewing of the contents of each receptacle from either the front or the back. Also, the grommets in the end series 25 provide a convenient means for attachment of strapping for wearing the receptacle around the waist in belt-like manner or on the chest from over a shoulder.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A multi-compartment receptacle, for holding and organizing fishing tackle or other items, comprising an elongate generally rectangular sheet of relatively heavy gauge flexible transparent sheet plastic material having first and second relatively long longitudinal edges and first and second relatively short end edges;

said sheet being folded on a first fold line extending from one end edge to the other spaced from said first longitudinal edge a predetermined distance to form a front wall for the receptacle bounded by said first longitudinal edge, said first fold line and said end edges, and a portion comprising a back wall coextensive with the front wall at the back of the front wall and a closure flap for the receptacle;

said portion being folded on a second fold line extending from one end edge of the sheet to the other spaced from said first fold line a distance corresponding generally to said predetermined distance to form said closure flap with said closure flap overlying the front wall;

said closure flap having a width less than half the height of the front and back walls;

said front and back walls being secured together along each of a plurality of lines extending heightwise thereof spaced at intervals along the length of the receptacle by a series of grommets and including a series of grommets adjacent each end of the receptacle, each grommet extending through registering holes in the front and back walls, thereby forming a plurality of compartments disposed side-by-side along the length of the receptacle;

the fold on said first fold line constituting the bottom of the receptacle and the fold on said second fold line being spaced from the bottom a distance corresponding generally to the height of the front wall and closely overlying the upper edge of the front wall with the flap extending down in front of the front wall for closing said compartments at the top thereof; and snap fastener means along the length of the closure flap below the upper edge of the front wall for releasably securing the flap in position closing each compartment and allowing the portion of the flap closing each compartment to be opened individually;

wherein the snap fastener means comprises snap fasteners in line with each series of grommets and snap fasteners midway of the series of grommets, and wherein the snap fastener means comprises snap fasteners having elements secured to the back wall and projections extending from said elements through holes in the front wall and elements secured to the flap having recesses receiving said projections.

2. A multi-compartment receptacle as set forth in claim 1 further having auxiliary snap fasteners for releasably securing the front and back walls together underneath the closure flap, each of these snap fasteners comprising an element secured to the back wall and an element secured to the front wall.

3. A multi-compartment receptacle as set forth in claim 2 wherein said auxiliary snap fasteners are in line with the series of grommets.

* * * * *